United States Patent
Ono

Patent Number: 5,353,161
Date of Patent: Oct. 4, 1994

[54] VARIABLE FOCAL LENGTH LENS

[75] Inventor: Kuniaki Ono, Ohmiya, Japan

[73] Assignee: Fuji Photo Optical Co., Ltd., Saitama, Japan

[21] Appl. No.: 20,413

[22] Filed: Feb. 22, 1993

[30] Foreign Application Priority Data

Mar. 27, 1992 [JP] Japan .................................. 4-070864

[51] Int. Cl.$^5$ .................................... G02B 15/14
[52] U.S. Cl. .................................... 359/691; 359/683
[58] Field of Search ............... 359/676, 683, 686, 689, 359/691

[56] References Cited

U.S. PATENT DOCUMENTS 3,870,401  3/1975  Muszumanski ...................... 359/793

FOREIGN PATENT DOCUMENTS 61-129613  6/1986  Japan .
61-248015  11/1986  Japan .................................. 359/793
62-280814  12/1987  Japan .................................. 359/793

Primary Examiner—Scott J. Sugarman
Attorney, Agent, or Firm—Brumbaugh, Graves, Donohue & Raymond

[57] ABSTRACT

A variable focal length lens comprises a first-set lens, which is constituted of two lenses and has a negative refracting power as a whole, and a second-set lens, which is constituted of five lenses and has a positive refracting power as a whole. The first-set lens and the second-set lens are located in this order from the side of a plane of image formation. The variable focal length lens satisfies the following condition formulas $$44 < (\nu_1 + \nu_2)/2 \tag{1}$$

$$0.35 < D_6/D_g < 0.6 \tag{2}$$

$$0.6 < |R_2/R_3| < 1.0 \tag{3}$$

wherein Ri represents the radius of curvature of an i'th surface of lens, as counted sequentially from the side of the plane of image formation, Di represents the axial air separation or thickness between an i'th surface of lens and an i+1'th surface of lens, as counted sequentially from the side of the plane of image formation, and $\nu i$ represents the Abbe's dispersion number of an i'th lens, as counted sequentially from the side of the plane of image formation.

2 Claims, 5 Drawing Sheets

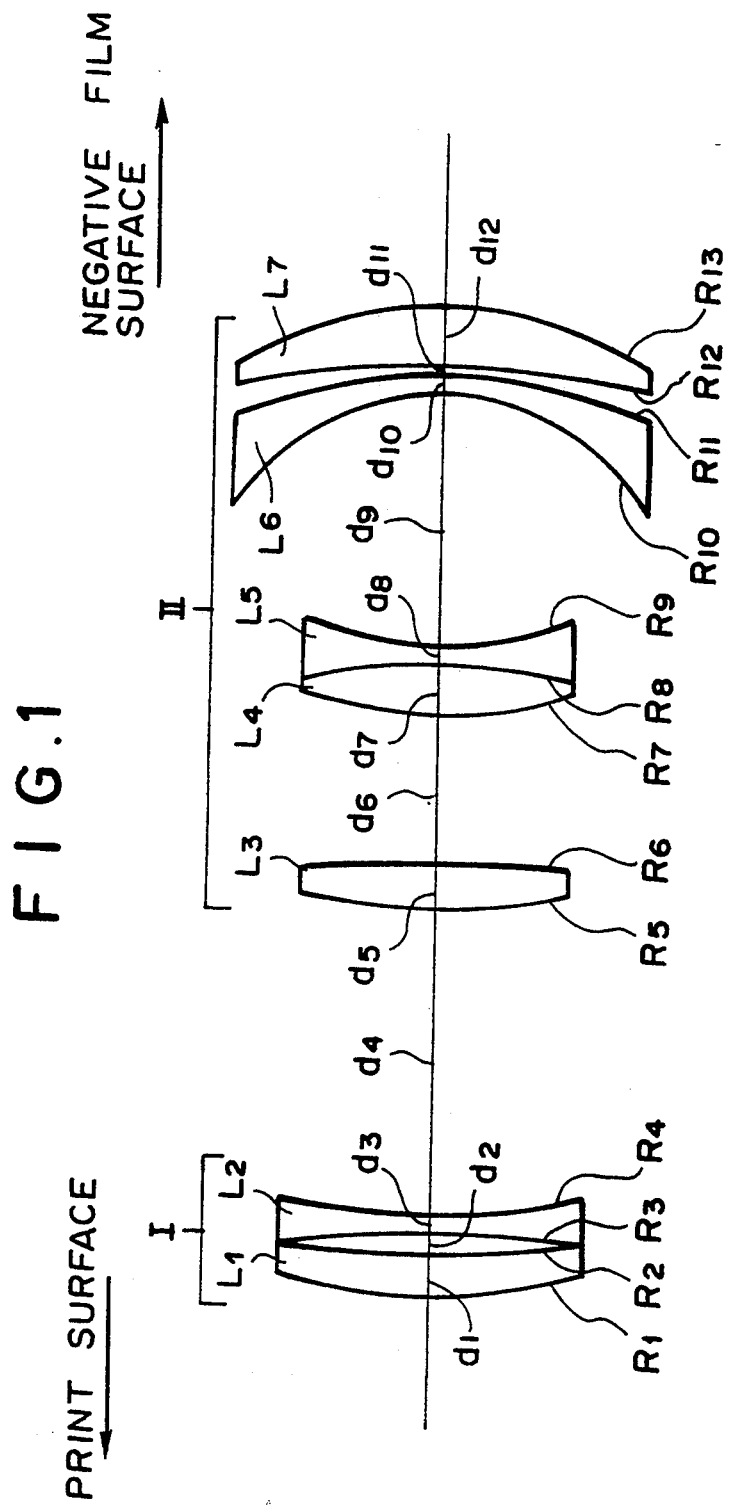

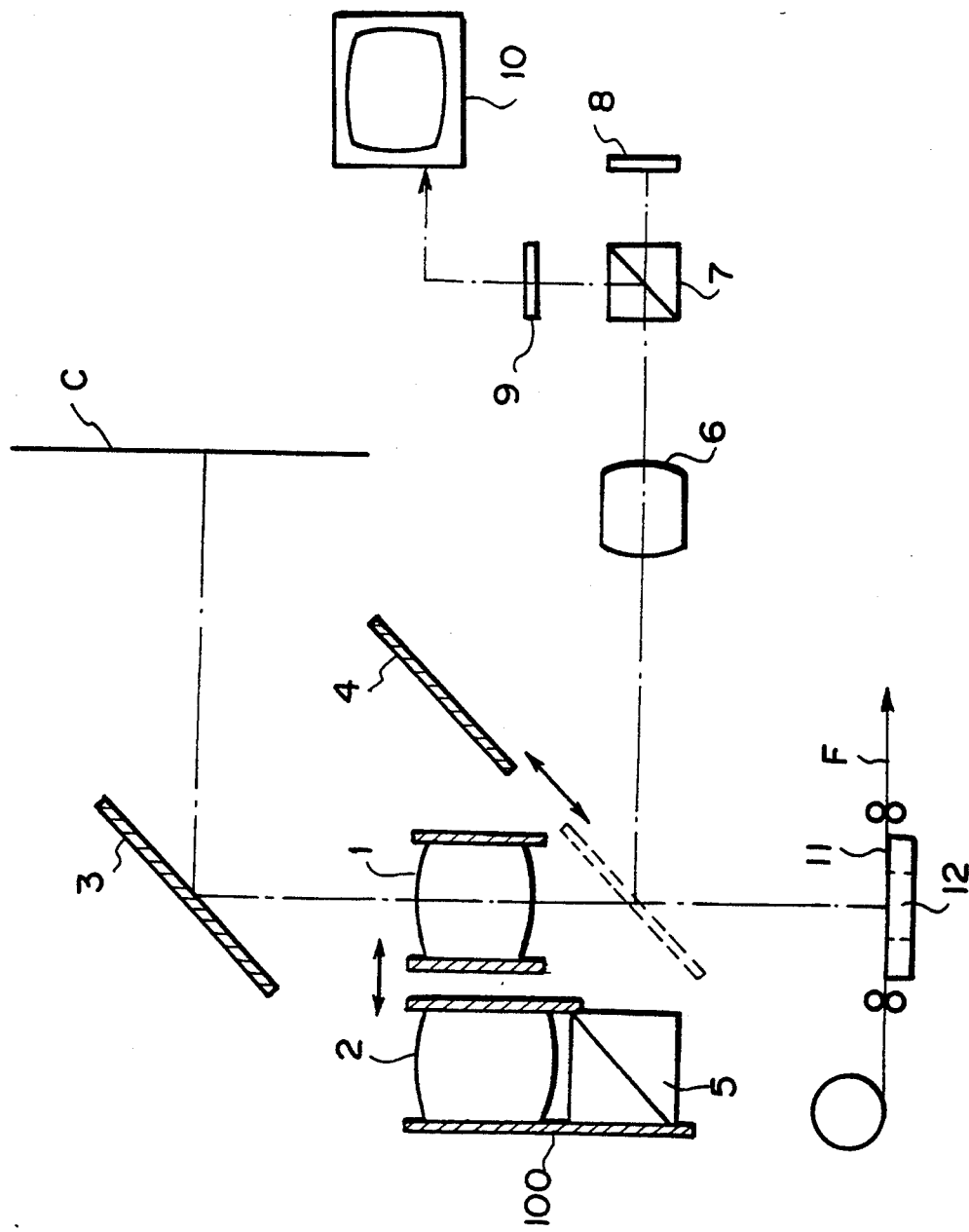

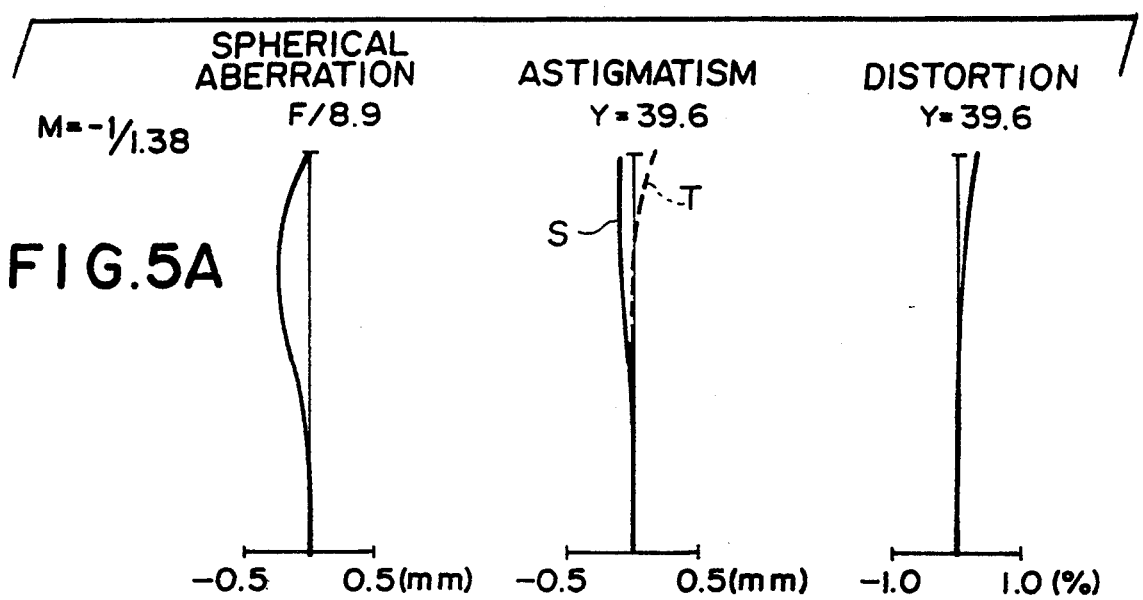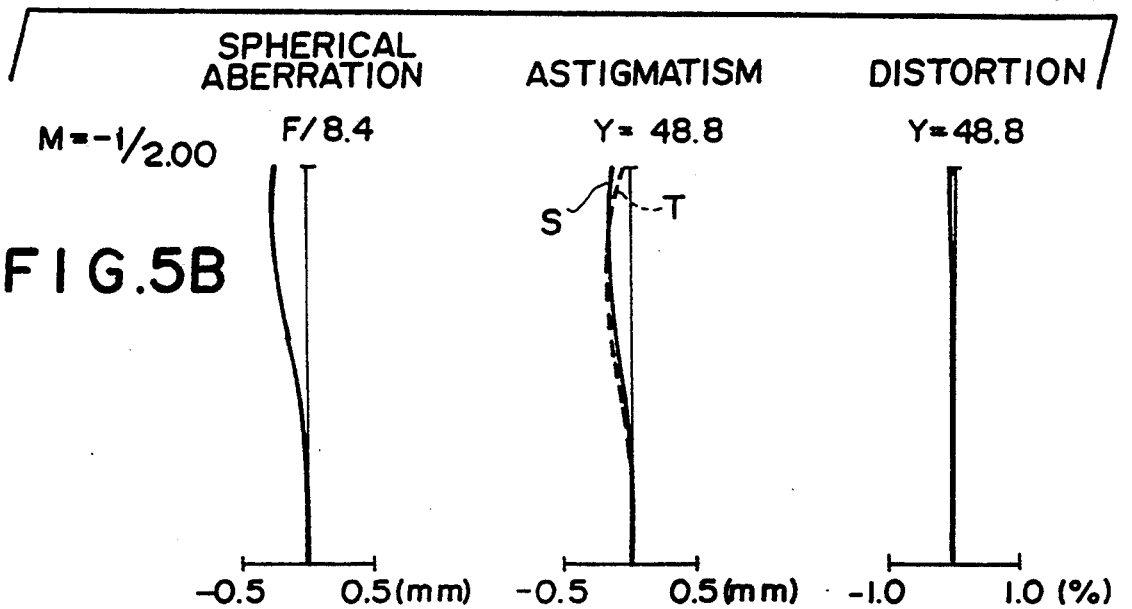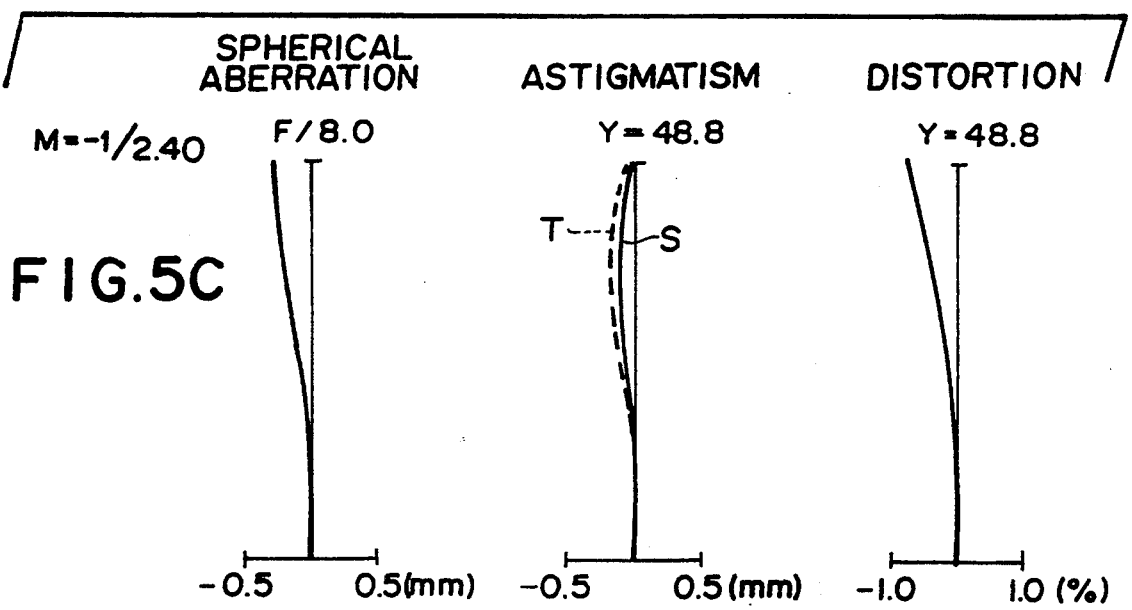

VARIABLE FOCAL LENGTH LENS

BACKGROUND OF THE INVENTION

1. Field of the Invention

This invention relates to a variable focal length lens for low magnification, which is to be used as a projecting lens for finite distances in a photograph enlarging apparatus, or the like.

2. Description of the Prior Art

Various photograph enlarging apparatuses, with which images recorded on negative films are printed on sheets of photographic paper, have heretofore been known. In photograph enlarging apparatuses for general use, a lens having a fixed focal length is used as a projecting lens, and the relative distances among the negative film the lens, and the photographic paper are changed respectively. On the other hand, in photograph enlarging apparatuses for business use, a variable focal length lens is often used as a projecting lens, and the positions of the negative film and the photographic paper are fixed.

As the variable focal length lens to be used in photograph enlarging apparatuses for business use, there has been known a lens composed of an ordinary fixed focal length lens and a single lens referred to as a diopter lens, which are combined with each other in an appropriate manner. The manner, in which the fixed focal length lens and the diopter lens are combined with each other, is changed in various ways, and the focal length is thereby changed in order to provide a predetermined magnification.

However, in cases where the variable focal length lens having the structure described above is used and the focal length is to be changed largely, the combination of the diopter lens becomes complicated. Therefore, the image quality of the resulting printed image inevitably becomes bad. Also, when a desired magnification is set, a long time is required for the positions of the lenses to be adjusted.

In view of the above circumstances, a novel variable focal length lens has been proposed in, for example, Japanese Unexamined Patent Publication No. 61(1986)-129613. In the proposed variable focal length lens, a lens system is constituted of two sets of lenses comprising a negative set lens and a positive set lens, and the focal length is changed by changing the distance between the two sets of lenses.

With the proposed variable focal length lens, the image quality of the printed image can be kept good, and the lens cost can be kept low because no diopter lens is required.

However, with the above-described conventional variable focal length lens comprising the two sets of lenses, the distance between the lens and the negative film (i.e., the finite back focal length) becomes as short as, for example, 90 mm or less at the time of a high magnification. If the finite back focal length is thus short, the operator cannot directly view the negative film due to a photometric mirror, which is inserted for color correction between the lens and the negative film. Therefore, the problem occurs in that the operator cannot easily carry out the printing work.

SUMMARY OF THE INVENTION

The primary object of the present invention is to provide a variable focal length lens, which is constituted of two sets of lenses comprising a negative set lens and a positive set lens, and in which a finite back focal length is kept markedly longer than in a conventional variable focal length lens.

Another object of the present invention is to provide a variable focal length lens, which is compact and has good image forming performance.

The present invention provides a variable focal length lens comprising a first-set lens, which is constituted of two lenses and has a negative refracting power as a whole, and a second-set lens, which is constituted of five lenses and has a positive refracting power as a whole, the first-set lens and the second-set lens being located in this order from the side of a plane of image formation, wherein the variable focal length lens satisfies the following condition formulas $$44 < (\nu_1 + \nu_2)/2 \tag{1}$$

$$0.35 < D_6/D_9 < 0.6 \tag{2}$$

$$0.6 < |R_2/R_3| < 1.0 \tag{3}$$

wherein Ri represents the radius of curvature of an i'th surface of lens, as counted sequentially from the side of the plane of image formation, Di represents the axial air separation or thickness between an i'th surface of lens and an i+1'th surface of lens, as counted sequentially from the side of the plane of image formation, and $\nu_i$ represents the Abbe's dispersion number of an i'th lens, as counted sequentially from the side of the plane of image formation.

The variable focal length lens in accordance with the present invention comprises two sets of lenses constituted of a negative set lens and a positive set lens. Also, the first-set lens is constituted of two lenses, the second-set lens is constituted of five lenses. Therefore, the variable focal length lens in accordance with the present invention is comparatively compact. Further, no diopter lens need be provided. Therefore, with the variable focal length lens in accordance with the present invention, the image quality of a printed image can be kept good, the lens size can be kept compact, and the lens cost can be kept low.

Furthermore, the variable focal length lens in accordance with the present invention satisfies the three Condition Formulas (1), (2), and (3) described above. Therefore, the image forming performance can be kept high, and at the same time the finite back focal length can be kept long.

Condition Formula (1) described above is defined in order to reduce a change in the chromatic aberration due to variable power and to facilitate the correction of aberrations on the long focal length side. Specifically, if Condition Formula (1) is not satisfied, the change in the chromatic aberration due to variable power will become large, and it will become difficult to carry out the correction of aberrations, in particular, on the long focal length side.

Condition Formula (2) described above is defined in order to keep the aberrations small and to keep the finite back focal length long. Specifically, if the value of $D_6/D_9$ goes beyond the upper limit defined in Condition Formula (2), the finite back focal length will become short, and it will become difficult to carry out correction of the coma. Conversely, if the value of $D_6/D_9$ is smaller than the lower limit defined in Condition Formula (2), the finite back focal length will become long, but it will become difficult to carry out correction of the spherical aberration and the chromatic aberration.

Condition Formula (3) described above is defined in order to keep the image forming performance. Specifically, if the absolute value of R2/R3 goes beyond the upper limit defined in Condition Formula (3), the inclination of the image surface will become large towards the negative side in cases of a high magnification, and will become large towards the positive side in cases of a low magnification. Conversely, if the absolute value of R2/R3 is smaller than the lower limit defined in Condition Formula (3), the inclination of the image surface will become large towards the positive side in cases of a high magnification, and will become large towards the negative side in cases of a low magnification. In cases where the absolute value of R2/R3 is larger than the upper limit or smaller than the lower limit defined in Condition Formula (3), it becomes difficult to carry out correction by changing the curvatures of the lens surfaces other than the lens surfaces having the radii of curvature R2 and R3.

As described above, with the variable focal length lens in accordance with the present invention, the lens structure can be kept compact, the optical performance can be kept good, and the back focal length can be kept long. Therefore, when the variable focal length lens in accordance with the present invention is used as, for example, a projecting lens in a photograph enlarging apparatus, the operator can easily see the negative film during the printing work, and the working efficiency and accuracy of the operator can be kept high. Also, the variable focal length lens in accordance with the present invention enables the apparatus to be kept compact and can prevent the image quality of the printed image from becoming bad.

BRIEF DESCRIPTION OF THE DRAWINGS

FIG. 1 is a sectional view showing an embodiment of the variable focal length lens in accordance with the present invention, FIG. 2 is a schematic view showing a photograph enlarging apparatus wherein the embodiment of FIG. 1 is employed, FIGS. 5A, 3B and 3C are diagrams showing the aberrations of a third embodiment of the variable focal length lens in accordance with the present invention.

DESCRIPTION OF THE PREFERRED EMBODIMENTS

Figure 3A:
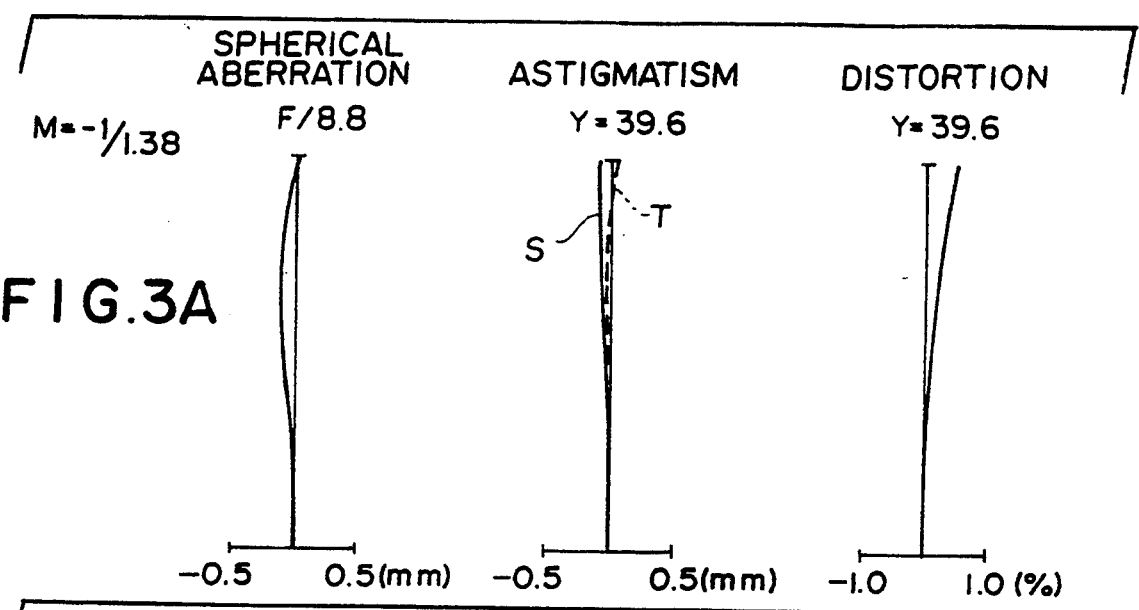
FIGS. 3A, 3B and 3C are diagrams showing the aberrations of a first embodiment of the variable focal length lens in accordance with the present invention.

The present invention will hereinbelow be described in further detail with reference to the accompanying drawings.

FIG. 2 schematically shows a photograph enlarging apparatus wherein an embodiment of the variable focal length lens in accordance with the present invention is employed. With reference to FIG. 2, negative film F is conveyed on a rectangular opening 12 of an exchangeable negative mask 11. A variable focal length lens 1 or a zoom lens 2, which can be exchanged with each other, projects an image having been recorded on the negative film F onto a print C via a reflecting mirror 3. Also, the photograph enlarging apparatus is provided with a reflecting mirror 4 and an optical path splitting prism 5 (a cubic block), which can be exchanged with each other. The reflecting mirror 4 deflects the light beam coming from the negative film F and guides it to a photometric system. Alternatively, the optical path splitting prism 5 splits a light beam coming from the negative film F into two light beams such that one of the two light beams may be guided to the photometric system. The zoom lens 2 and the optical path splitting prism 5 are supported integrally with each other to constitute a zoom lens optical system 100. When the zoom lens optical system 100 is removed and the variable focal length lens 1 is inserted into the optical path, the reflecting mirror 4 is inserted into the optical path and serves as a light deflecting means for guiding the light beam to the photometric system. When projection of the negative image is carried out by using the variable focal length lens 1, the reflecting mirror 4 is retracted to the position indicated by the solid line in FIG. 2. An image of the light beam, which has been deflected from the projecting optical path by the optical path splitting prism 5 or the reflecting mirror 4, is formed on a photometric device 8 by an image forming lens 6 of the photometric system. Also, part of the light beam, which has been deflected from the projecting optical path by the optical path splitting prism 5 or the reflecting mirror 4, is separated by an optical path splitting prism 7. An image of the thus separated part of the light beam is formed on a light receiving face of an image pickup device 9, which is used for monitoring purposes. An image signal, which has been generated by the image pickup device 9, is fed into a monitor television set 10. An image reproduced on the monitor television set 10 from the image signal is used for adjustment of the image position during the printing process, or the like. The negative mask 11 is provided with the rectangular opening 12 having a size corresponding to the image area size of the negative film F and is exchanged in accordance with the negative film F.

First to third embodiments of the variable focal length lens 1 in accordance with the present invention will be described hereinbelow with reference to FIG. 1.

The first embodiment of the variable focal length lens 1 comprises a first-set lens I and a second-set lens II, which are located in this order from the side of the plane of image formation (i.e., the surface of the print). The first-set lens I is constituted of two lenses L1 and L2 and has a negative refracting power as a whole. The second-set lens II is constituted of five lenses L3, L4, L5, L6, and L7 and has a positive refracting power as a whole. The distance between the first-set lens I and the second-set lens II is variable.

The variable focal length lens 1 satisfies the conditions of Condition Formulas (1), (2), and (3)

$$44 < (\nu_1 + \nu_2)/2 \tag{1}$$

$$0.35 < D_6/D_g < 0.6 \tag{2}$$

$$0.6 < |R_2/R_3| < 1.0 \tag{3}$$

wherein Ri represents the radius of curvature of an i'th surface of lens, as counted sequentially from the side of the plane of image formation, Di represents the axial air separation or thickness between an i'th surface of lens and an i+1'th surface of lens, as counted sequentially from the side of the plane of image formation, and $\nu i$ represents the Abbe's dispersion number of an i'th lens, as counted sequentially from the side of the plane of image formation.

The lens L1 is a positive meniscus lens located such that its convex surface may stand facing the side of the print surface. The lens L2 is a double-concave lens located such that its surface having a larger curvature may stand facing the side of the negative film surface. The lens L3 is a double-convex lens located such that its surface having a larger curvature may stand facing the side of the print surface. The lens L4 is a double-convex lens located such that its surface having a larger curvature may stand facing the side of the print surface. The lens L5 is a double-concave lens located such that its surface having a larger curvature may stand facing the side of the negative film surface. The lens L6 is a negative meniscus lens located such that its convex surface may stand facing the side of the negative film surface. The lens L7 is a positive meniscus lens located such that its convex surface may stand facing the side of the negative film surface.

In the first embodiment of the variable focal length lens 1, the magnification of the zoom lens 1 can be changed in the range of $-1/1.38$ to $-1/2.4$. Table 1 shows an overall focal length f, a finite back focal length Bf, an F-number FNO, and an image height (negative size) Y for each value of the magnification of the variable focal length lens 1 in the first embodiment.

TABLE 1

| Magnification M | −1/1.38 | −1/2.00 | −1/2.40 |
|---|---|---|---|
| Focal length f | 170.02 | 155.12 | 144.62 |
| Finite back focal length Bf | 217.85 | 166.41 | 145.03 |
| F-number $F_{NO}$ | 8.8 | 8.3 | 8.0 |
| Image height (negative size) Y | 39.6 | 48.8 | 48.8 |

Table 2 shows the radii of curvature R (mm) of the surfaces of the respective lenses, and the axial thicknesses of the lenses and the axial air separations between the lenses, d (mm), in the first embodiment. Table 2 also shows the refractive indices N of the respective lenses with respect to the d-line, and the Abbe's dispersion numbers $\nu(\nu d$, this also applies in the descriptions below) of the respective lenses in the first embodiment.

In Table 2, numbers affixed to reference characters R, d, N, and n represent the order from the side of the print surface.

TABLE 2

| NO. | Radius of curvature R | Axial air separation or thickness d | Refractive index N | Abbe's dispersion number $\nu d$ |
|---|---|---|---|---|
| 1 | 59.894 | 4.50 | 1.62004 | 36.3 |
| 2 | 113.525 | 2.10 | | |
| 3 | −153.949 | 2.00 | 1.51742 | 52.2 |
| 4 | 85.933 | (Variable D) | | |
| 5 | 60.875 | 5.00 | 1.74400 | 44.9 |
| 6 | −460.386 | 16.12 | | |
| 7 | 43.284 | 6.00 | 1.61800 | 63.4 |
| 8 | −64.515 | 1.50 | 1.71736 | 29.5 |
| 9 | 36.963 | 28.67 | | |
| 10 | −26.798 | 2.00 | 1.58904 | 53.2 |
| 11 | −58.238 | 1.00 | | |
| 12 | −101.572 | 6.50 | 1.72825 | 28.3 |
| 13 | −41.523 | | | |

Focal length f1 of the first-set lens = −252.74 mm
Focal length f2 of the second-set lens = 98.74 mm The distance between the first-set lens I and the second-set lens II is variable. Table 3 shows the distance D between the first-set lens I and the second-set lens II for each value of the magnification (M).

TABLE 3

| Magnification M | D |
|---|---|
| −1/1.38 | 7.690 |
| −1/2.00 | 21.783 |
| −1/2.40 | 33.471 |

A second embodiment of the variable focal length lens 1 will be described hereinbelow. The structure of the second embodiment is approximately identical with the structure of the first embodiment.

Table 4 shows the overall focal length f, the finite back focal length Bf, the F-number FNO, and the image height (negative size) Y for each value of the magnification of the second embodiment of the variable focal length lens 1.

TABLE 4

| Magnification M | −1/1.38 | −1/2.00 | −1/2.40 |
|---|---|---|---|
| Focal length f | 170.11 | 155.12 | 144.54 |
| Finite back focal length Bf | 219.56 | 167.73 | 146.08 |
| F-number $F_{NO}$ | 8.9 | 8.3 | 8.0 |
| Image height (negative size) Y | 39.6 | 48.8 | 48.8 |

Table 5 shows the radii of curvature R (mm) of the surfaces of the respective lenses, and the axial thicknesses of the lenses and the axial air separations between the lenses, d (mm), in the second embodiment. Table 5 also shows the refractive indices N of the respective lenses with respect to the d-line, and the Abbe's dispersion numbers $\nu(\nu d$, this also applies in the descriptions below) of the respective lenses in the second embodiment.

In Table 5, numbers affixed to reference characters R, d, N, and $\nu$ represent the order from the side of the print surface.

TABLE 5

| NO. | Radius of curvature R | Axial air separation or thickness d | Refractive index N | Abbe's dispersion number $\nu d$ |
|---|---|---|---|---|
| 1 | 61.848 | 4.50 | 1.60342 | 38.0 |
| 2 | 111.271 | 2.10 | | |
| 3 | −139.911 | 2.00 | 1.51823 | 59.0 |
| 4 | 97.205 | (Variable D) | | |
| 5 | 60.049 | 5.00 | 1.74400 | 44.9 |
| 6 | −479.256 | 16.12 | | |
| 7 | 42.664 | 6.00 | 1.61800 | 63.4 |
| 8 | −61.681 | 1.50 | 1.71736 | 29.5 |
| 9 | 36.749 | 28.17 | | |
| 10 | −26.593 | 2.00 | 1.58904 | 53.2 |
| 11 | −57.313 | 1.00 | | |
| 12 | −106.100 | 6.50 | 1.72825 | 28.3 |
| 13 | −41.970 | | | |

Focal length f1 of the first-set lens = −236.99 mm
Focal length f2 of the second-set lens = 96.95 mm The distance between the first-set lens I and the second-set lens II is variable. Table 6 shows the distance D between the first-set lens I and the second-set lens II for each value of the magnification (M).

TABLE 6

| Magnification M | D |
|---|---|
| −1/1.38 | 7.819 |
| −1/2.00 | 20.870 |

TABLE 6-continued

| Magnification M | D |
|---|---|
| −1/2.40 | 31.704 |

A third embodiment of the variable focal length lens 1 will be described hereinbelow. The structure of the third embodiment is approximately identical with the structure of the first embodiment.

Table 7 shows the overall focal length f, the finite back focal length Bf, the F-number FNO, and the image height (negative size) Y for each value of the magnification of the third embodiment of the variable focal length lens 1.

TABLE 7

| Magnification M | −1/1.38 | −1/2.00 | −1/2.40 |
|---|---|---|---|
| Focal length f | 169.66 | 154.80 | 144.29 |
| Finite back focal length Bf | 217.00 | 165.64 | 144.25 |
| F-number $F_{NO}$ | 8.9 | 8.3 | 8.0 |
| Image height (negative size) Y | 39.6 | 48.8 | 48.8 |

Table 8 shows the radii of curvature R (mm) of the surfaces of the respective lenses, and the axial thicknesses of the lenses and the axial air separations between the lenses, d (mm), in the third embodiment. Table 8 also shows the refractive indices N of the respective lenses with respect to the d-line, and the Abbe's dispersion numbers $\nu(\nu d$, this also applies in the descriptions below) of the respective lenses in the third embodiment.

In Table 8, numbers affixed to reference characters R, d, N, and $\nu$ represent the order from the side of the print surface.

TABLE 8

| NO. | Radius of curvature R | Axial air separation or thickness d | Refractive index N | Abbe's dispersion number $\nu d$ |
|---|---|---|---|---|
| 1 | 61.422 | 4.50 | 1.62004 | 36.3 |
| 2 | 112.367 | 2.10 | | |
| 3 | −149.846 | 2.00 | 1.51742 | 52.2 |
| 4 | 91.878 | (Variable D) | | |
| 5 | 57.138 | 5.00 | 1.73520 | 41.0 |
| 6 | −465.376 | 11.88 | | |
| 7 | 43.294 | 6.00 | 1.62299 | 58.1 |
| 8 | −56.918 | 1.50 | 1.71736 | 29.5 |
| 9 | 36.294 | 31.71 | | |
| 10 | −27.792 | 2.00 | 1.58904 | 53.2 |
| 11 | −55.843 | 1.00 | | |
| 12 | −97.712 | 6.50 | 1.72825 | 28.3 |
| 13 | −44.518 | | | |

Focal length f1 of the first-set lens = −249.74 mm
Focal length f2 of the second-set lens = 97.90 mm The distance between the first-set lens I and the second-set lens II is variable. Table 9 shows the distance D between the first-set lens I and the second-set lens II for each value of the magnification (M).

TABLE 9

| Magnification M | D |
|---|---|
| −1/1.38 | 8.513 |
| −1/2.00 | 22.842 |

TABLE 9-continued

| Magnification M | D |
|---|---|
| −1/2.40 | 33.844 |

Figure 3B:
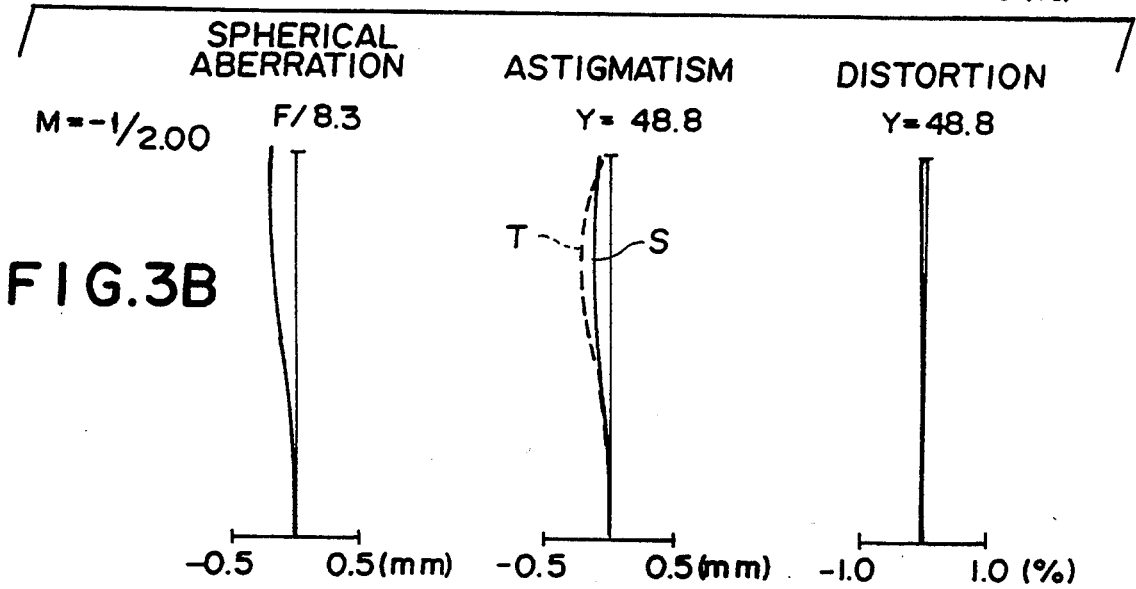
Figure 3C:
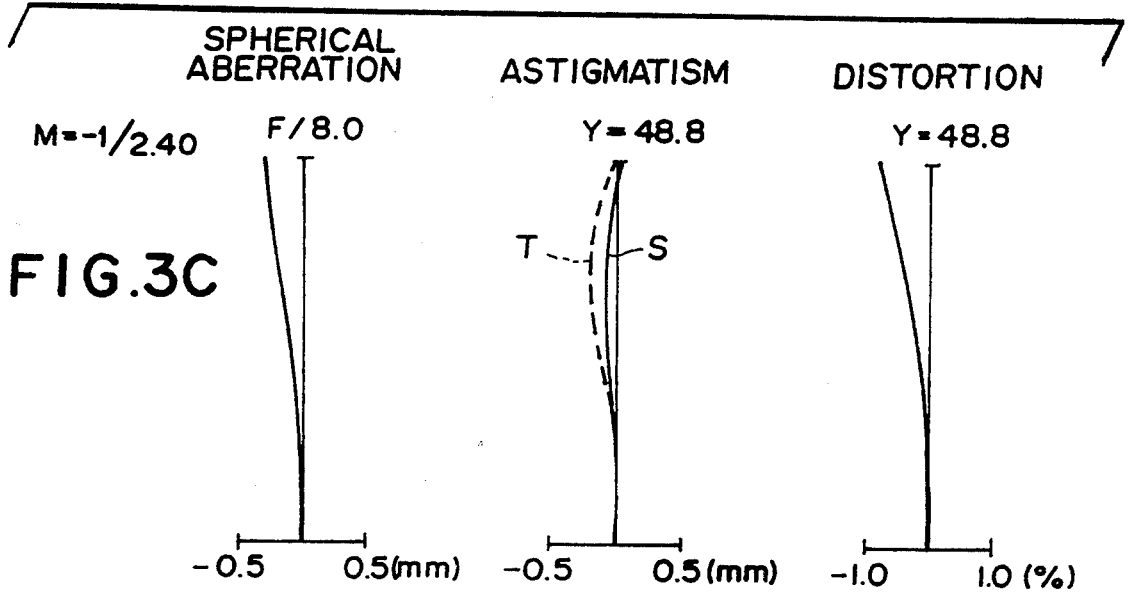
Figure 4A:
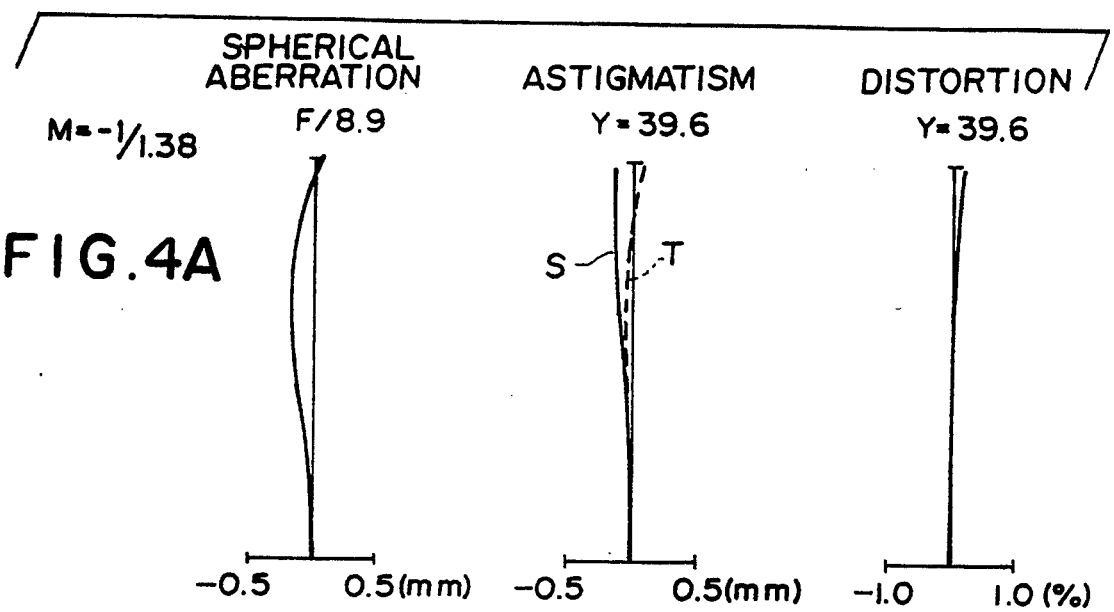
FIGS. 4A, 4B and 4C are diagrams showing the aberrations of a second embodiment of the variable focal length lens in accordance with the present invention.
Figure 4B:
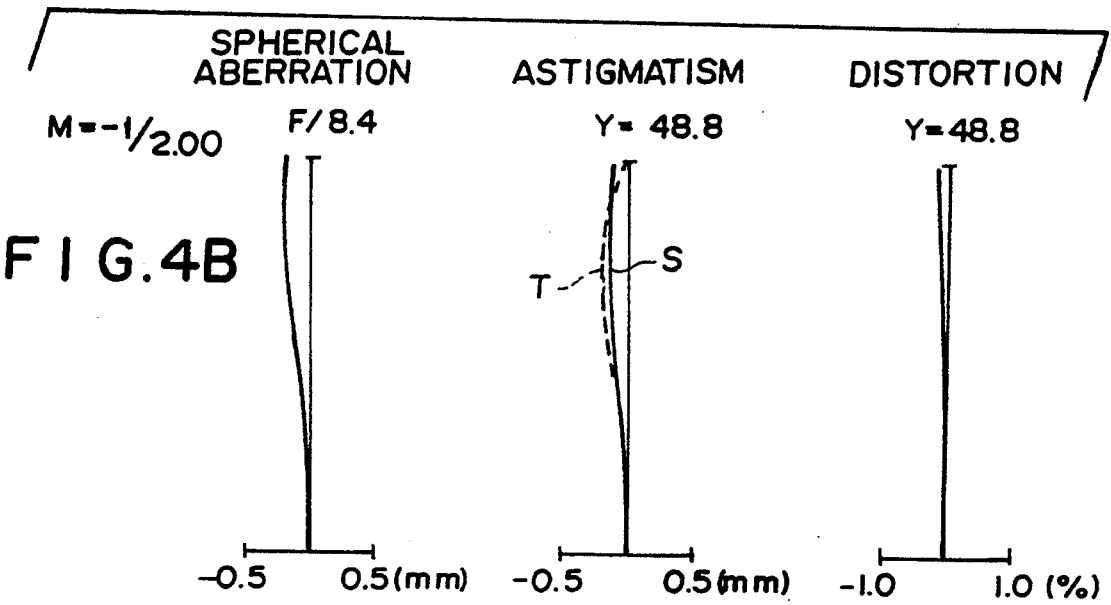
Figure 4C:
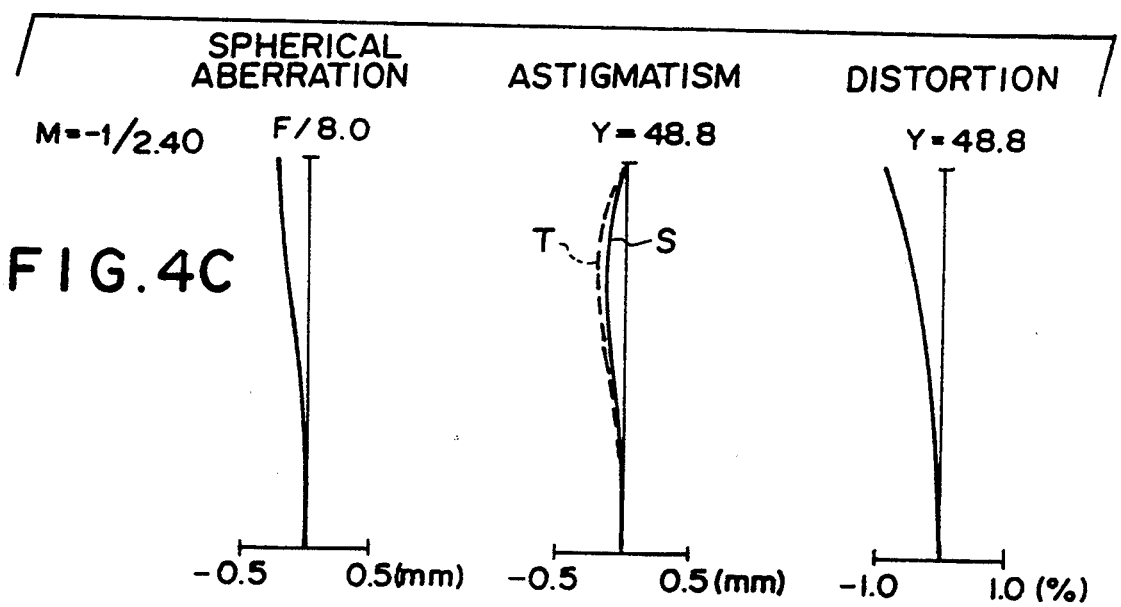

FIGS. 3A, 3B, 3C, 4A, 4B, 4C, 5A, 5B and 5C show the aberrations of the first, second, and third embodiments described above. In each of these aberration diagrams, states of each aberration for the three values of the magnification shown in each of the tables shown above are illustrated.

From these aberration diagrams, it is clear that, in every embodiment of the variable focal length lens 1, good optical performance is kept over the whole variable power range.

Also, as shown in each table shown above, the back focal length Bf, i.e., the distance between the final lens surface and the negative film F, can be kept at 140 mm or longer at the time of a high magnification and can thus be kept at a value sufficiently larger than the value obtained with the conventional technique.

The structure of the variable focal length lens in accordance with the present invention is not limited to those of the three embodiments described above. For example, the number of the lenses constituting each lens set, the curvature of each lens, or the like, may be changed. In such cases, the same effects as those of the embodiments described above can be obtained.

The variable focal length lens in accordance with the present invention is particularly useful when it is utilized in photograph enlarging apparatuses. However, the variable focal length lens in accordance with the present invention is also applicable to any of various other optical apparatuses.

What is claimed is:

1. A variable focal length lens comprising a first-set lens, which is constituted of two lenses and has a negative refracting power as a whole, and a second-set lens, which is constituted of five lenses and has a positive refracting power as a whole, the first-set lens and the second-set lens being located in this order from the side of a plane of image formation, wherein the variable focal length lens satisfies the following condition formulas $$44 < (\nu_1 + \nu_2)/2 \quad (1)$$

$$0.35 < D_6/D_8 < 0.6 \quad (2)$$

$$0.6 < |R_2/R_3| < 1.0 \quad (3)$$

wherein Ri represents the radius of curvature of an i'th surface of lens, as counted sequentially from the side of the plane of image formation, Di represents the axial separation or thickness between an i'th surface of lens and an i+1'th surface of lens, as counted sequentially from the side of the plane of image formation, and $\nu i$ represents the Abbe's dispersion number of an i'th lens, as counted sequentially from the side of the plane of image formation.

2. A variable focal length lens as defined in claim 1 wherein the variable focal length lens is adapted to be used as a projecting lens in a photograph enlarging apparatus.

* * * * *